3,770,803
α-FLUORO-1-NAPHTHALENEMALONIC ACID AND
DERIVATIVES THEREOF
Bruno Cavalleri, Milan, and Elvio Bellasio, Albate, Como,
Italy, Emilio Testa, Ticino, Switzerland, and Giulio
Maffii, Milan, Italy, assignors to Gruppo Lepetit S.p.A.,
Milan, Italy
No Drawing. Continuation-in-part of application Ser. No.
750,009, Aug. 5, 1968, now Patent No. 3,699,151. This
application Dec. 6, 1968, Ser. No. 781,999
Int. Cl. C07c 63/56, 69/76
U.S. Cl. 260—475 FR                               3 Claims

ABSTRACT OF THE DISCLOSURE

The application concerns a new class of α-fluoro-1-naphthalenealkanoic acids and their derivatives, i.e. metal salts, esters and amides, useful for the control of the growth of and for killing plants.

---

This application is a continuation-in-part of our copending application Ser. No. 750,009, filed Aug. 5, 1968, now U.S. Pat. 3,699,151.

The invention is concerned with α-fluoro-1-naphthalenealkanoic acid compounds represented by the formula

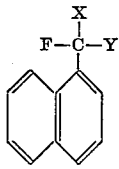

where X is hydrogen or Y, and Y is a carboxylic acid derived group such as carboxyl, carboxylic acid salt, amide, or ester and wherein the Y groups can be the same or different in a given compound.

Representative materials falling within the scope of this definition include:

α-fluoro-1-naphthalenemalonic acid,
α-fluoro-1-naphthaleneacetic acid,
diethyl α-fluoro-1-naphthalenemalonate,
ethyl α-fluoro-1-naphthaleneacetate,
diisooctyl α-fluoro-1-naphthalenemalonate,
potassium ethyl α-fluoro-1-naphthalenemalonate,
potassium α-fluoro-1-naphthaleneacetate,
sodium α-fluoro-1-naphthaleneacetate,
n-hexyl methyl α-fluoro-1-naphthalenemalonate,
di-2-hydroxyethyl α-fluoro-1-naphthalenemalonate,
isobutyl α-fluoro-1-naphthaleneacetate,
2-ethylhexyl propyl α-fluoro-1-naphthalenemalonate,
alkyl α-fluoro-1-naphthaleneacetate,
di-2-nitroethyl α-fluoro-1-naphthalenemalonate,
n-decyl α-fluoro-1-naphthaleneacetate,
di-n-decyl α-fluoro-1-naphthalenemalonate,
calcium α-fluoro-1-naphthaleneacetate,
ammonium α-fluoro-1-naphthaleneacetate,
di-2-hydroxyethylammonium α-fluoro-1-naphthalenemalonate,
2-hydroxyethyl α-fluoro-1-naphthaleneacetate,
di-propargyl α-fluoro-1-naphthalenemalonate,
n-propyl-α-fluoro-1-naphthaleneacetate,
n-pentyl 2-hydroxyethyl α-fluoro-1-naphthalenemalonate,
tris(2-hydroxyethyl)-ammonium α-fluoro-1-naphtheneacetate,
di-tris(2-hydroxypropyl)-ammonium α-fluoro-1-naphthalenemalonate,
2-(dimethylamino)ethyl α-fluoro-1-naphthaleneacetate,
di-2-(2-ethoxyethoxy)-ethyl α-fluoro-1-naphthalenemalonate,
2-(diethylamino)ethyl heptyl α-fluoro-1-naphthalenemalonate,
disodium α-fluoro-1-naphthalenemalonate,
barium α-fluoro-1-naphthalenemalonate,
n-decylammonium α-fluoro-1-naphthaleneacetate.

Other representative materials are illustrated by defining substituents appropriate for Y of the formula as hereinafter more fully disclosed.

The carboxylic acid group or functional derivatives thereof, i.e. the Y of the formula, may be represented by the radicals —COOH, —COOM, —CONH$_2$, —CONHR$^1$, —CONR$^1$R$^2$ and —COOR$^3$. In the above radicals, M represents a salt group inclusive of alkali and alkaline earth salts such as sodium, potassium, lithium, magnesium, calcium, salts of other metals such as copper, iron, zinc, cobalt, nickel, ammonium and substituted ammonium salts. Preferred salts include the ammonium, lower alkylamine and lower alkanolamine salts wherein each alkyl and alkanol radical contains from 1 to 10 carbon atoms, such as methylammonium, trimethylammonium, dimethylammonium, ethylammonium, diethylammonium, triethylammonium, n-propylammonium, isopropylammonium, di-n-propylammonium, diisopropylammonium, bis(3-hydroxypropyl)-ammonium, 3-hydroxypropylammonium, 2 - hydroxypropylammonium, bis(2 - hydroxypropyl)ammonium, tetramethylammonium, tetraethylammonium, etc. R$^1$ and R$^2$ are lower aliphatic radicals preferably containing up to 10 carbon atoms such as methyl, ethyl, n-propyl, isopropyl, 2-hydroxyethyl, allyl, crotyl, n-butyl, tert.-butyl, methallyl, 3-hydroxypropyl, 2-hydroxypropyl, etc. R$^3$ is a residue of a hydroxy compound obtained by the removal of the OH group. Suitable hydroxy compounds include methanol, isopropyl alcohol, sec.-butyl alcohol, amyl alcohol, hexanol, octyl alcohol, heptyl alcohol, decyl alcohol, methallyl alcohol, polyhydroxy alcohols such as ethylene glycol, polyethylene glycol, trimethylene glycol, ether alcohols of ethylene and alkylene glycols marketed under trade names such as Dowanols and Cellosolves, nitroalcohols such as 2-nitropropanol and 2-nitroethanol, acetylenic alcohols such as 2-propargyl alcohol, 2-methyl-3-butynol-2,3-methyl-1-pentynol - 3,3 - butyne - 1 - ol, 2-butyne-1,4-diol, 2,4-hexadiyne-1,6-diol, 3,6 - dimethyl - 4-octyne-3,6-diol, and other hydroxy compounds such as dialkylaminoalcohols. Preferred compounds include the lower alkyl esters, monoglycol lower alkyl ether esters and diglycol lower alkyl ether esters wherein glycol is of the ethylene and/or propylene series and lower alkyl contains from 1 to 10 carbon atoms, inclusive.

The products of the present invention are crystalline solids or liquids, generally of low to moderate solubility in water and of moderate to high solubility in organic solvents such as acetone, xylene, ethanol, isopropyl alcohol, dimethylformamide and dimethyl sulfoxide.

The compounds are useful for the modification and alteration of the growth of plants and plant parts, and/or for the control of the growth and killing of plants and plant parts.

The product of the present invention which is a free dicarboxylic acid, i.e. the compound where both X and Y of the formula are —COOH and which is called α-fluoro-1-naphthalenemalonic acid, may be prepared for instance from the corresponding 1-naphthalenemalonic dinitrile, which is converted to the alkali metal salt by reaction with a stoichiometric amount of an alkali metal hydride, and fluorinated with perchloryl fluoride $FClO_3$; the α-fluoro-1-naphthalenedinitrile is then hydrolized to the diacid through conventional procedures.

Both the mono- and the dicarboxylic acids may be prepared by a method wherein the corresponding lower alkyl ester, prepared as hereinafter described, is hydrolized. The hydrolysis can be conveniently carried out by reacting the ester in dilute base such as aqueous alkali until the reaction is substantially complete. Thereafter, the mixture is acidified to recover the desired α-fluoro-1-naphthalenealkanoic acid. The latter may then be recovered and purified according to conventional procedures.

The α-fluoro - 1 - naphthalenealkanoic acid compounds which are esters i.e., compounds wherein Y in the formula is —COOR$^3$, may be prepared by reacting and/or esterifying a corresponding α-fluoro - 1 - naphthalenealkanoic acid or a derivative thereof, such as for instance a halide, with an appropriate hydroxy compound having the formula R$^3$OH. The esterification preferably is carried out in the presence of an esterification catalyst. When R$^3$OH is alkanol containing from about 1 to 10 carbon atoms, the ester may be prepared by mixing the acid and alcohol reactants together in the presence of an acid catalyst whereupon a reaction takes place with the formation of the desired α-fluoro - 1 - naphthalenealkanoate ester product.

Gaseous hydrogen fluoride or chloride is conveniently employed as a catalyst, although other acidic esterification catalysts may be employed. With lower boiling alcohols, excess alcohol may be employed to serve as reaction medium. With higher boiling alcohols, an inert solvent such as benzene or xylene may be employed. The reaction takes place readily over a temperature in the range of from about 10° C. to about 150° C. or the boiling point of alcohol reactant or solvent. The amounts of the reactants are not critical but the reaction is facilitated by employing a stoichiometric excess of alcohol. The time is not critical and depends to some extent on the reaction temperature.

In a preferred method for carrying out the reaction, the appropriate α-fluoro-1-naphthalenealkanoic acid and the appropriate hydroxy compound are mixed together and gaseous hydrogen chloride added thereto while maintaining the temperature below about 10° C. until the reaction mixture is saturated with hydrogen chloride. The mixture is then allowed to warm to room temperature and kept at room temperature for several hours, conveniently overnight. Thereafter, the unreacted alcohol and hydrogen chloride are removed by vaporization and the desired α-fluoro-1-naphthalenealkanoates ester product recovered by conventional procedures.

Certain ester compounds such as those derived from hydroxy compounds wherein R$^3$OH is an alkenyl or alkynyl alcohol, are preferably prepared by another procedure wherein salt, preferably an alkali metal salt is reacted with a halide corresponding to the alcohol to produce the ester product. Substantially stoichiometric amounts of the reactants are employed and the reaction is preferably carried out in an inert solvent such as dimethylformamide or dimethyl sulfoxide. The reaction may be carried out in the temperature range of from about 60° to about 160° C.

In carrying out the reaction, the appropriate alkenyl or alkynyl halide is added portionwise, preferably dropwise, to a warm solution of alkali metal salt of the α-fluoro-1-naphthalenealkanoic acid and thereafter maintained in the preferred temperature range of from about 60° C. to about 160° C. for several hours to obtain the desired ester product.

The latter may be obtained from the reaction mixture by pouring the mixture into water to separate the α-fluoro-1-naphthalene-alkanoate ester product which can be recovered and purified, if desired, by conventional procedures.

The ester compounds of the present invention derived from hydroxy compounds which are polyglycol ether alcohols, dialkylaminoalkanols, and higher molecular weight alcohols, may be prepared from the corresponding acid chloride and appropriate hydroxy compound in the presence of tertiary amine to produce the desired ester product and hydrogen chloride by-product. The exact amounts of the reactants are not critical, some product being obtained in any case; usually stoichiometric amounts of the reactants are employed. A large excess of water-miscible tertiary amine conveniently is used, the tertiary amine functioning not only to promote the reaction but also to act as a solvent medium. The tertiary amine also reacts with the hydrogen chloride by-product to form the tertiary amine hydrochloride salt. Suitable tertiary amines include pyridine, picoline, trimethylamine and triethylamine. Supplemental solvents such as benzene or xylene may also be employed. The reaction can be carried out over a period of from about 1 hour to about 10 hours at temperatures ranging from room temperature to the boiling point of the solvent. The product may be isolated from the reaction mixture by pouring the mixture into cold, dilute aqueous alkali metal bicarbonate solution or water whereupon the desired ester compound of the α-fluoro-1-naphthalenealkanoic acid is extracted by an appropriate solvent not miscible with water.

In carrying out preparation of the esters according to this method, the acid chloride can be prepared as the first step of the reaction by warming together on a steam bath an α-fluoro-1-naphthalenealkanoic acid compound with a stoichiometric excess of thionyl chloride. The heating process is continued until the reaction is complete. The mixture is then subjected to reduced pressure to remove the excess thionyl chloride and to recover a α-fluoro-1-naphthalenealkanoyl chloride compound which is then used in the second step of the reaction.

The appropriate hydroxy compound is dissolved in excess tertiary amine base and thereafter, the α-fluoro-1-naphthalenealkanoyl chloride compound, usually in benzene solution, is added portionwise thereto. The mixture is allowed to react at a temperature in the range of from room temperature to the boiling point of the solvent for from about 1 hour to 10 hours and thereafter added slowly to cold water or to cold, dilute alkali bicarbonate to separate the desired ester compound of the α-fluoro-1-naphthalenealkanoic acid. The latter may then be recovered from the mixture by conventional produces such as by filtration or extraction with a water-immiscible organic solvent. Alternatively, the α-fluoro-1-naphthalenemalonic esters may be conveniently prepared by fluorination of the corresponding 1-naphthalenemalonic esters with $FClO_3$, according to the procedure above described for the preparation of 1-naphtholenemalonic dinitrile.

The products of the present invention which are salts, i.e., Y in the formula is —COOM, may be prepared by the reaction of the appropriate α-fluoro-1-naphthalenealkanoic acid compound with the appropriate metal or ammonium or quaternary ammonium hydroxide or amine, including the lower alkylamines and lower alkanolamines wherein each lower alkyl and lower alkanol contains from 1 to 10 carbon atoms. In carrying out the reaction, the procedures which can be followed are entirely obvious to any skilled chemist.

The products of the present invention which are amides, i.e., compounds wherein Y in the formula is —CONH$_2$, —CONHR$^1$ or CONR$^1$R$^2$, may be prepared by reacting an appropriate α-fluoro-1-naphthalene-alkanoic acid halide or ester, preferably the chloride or a lower alkyl ester with an appropriate nitrogen base. Thus, the amides may be prepared by reacting the ester with ammonia, or appropriate amine, R$^1$NH$_2$ or R$^1$R$^2$NH. The reaction takes place smoothly at a temperature of from about 15° C. to about 100° C. at atmospheric pressure or autogeneous pressure of the closed system. The amounts of the reactants are not critical; however, stoichiometric excess of the ammonia or amine reactant is desirable. The reaction may be carried out in the presence of a solvent. Suitable solvents include alcohol or water or mixtures thereof. As a result of these steps the amide is obtained and may be recovered as residue by vaporizing off the solvent and/or unreacted nitrogen base. The product may then be purified by conventional procedures.

In carrying out the reaction, the α-fluoro-1-naphthalenealkanoate ester compound and appropriate nitrogen base can be mixed together in an aqueous or alcoholic solvent and the resulting mixture heated at reflux temperature for several minutes whereupon a reaction takes place with the formation of the amide compound of the α-fluoro-1-naphthalenealkanoic acid. The product is thereafter recovered by conventional procedures.

The compounds of the present invention may be prepared by adaptations of procedures known to the skilled in the art. Thus, it is to be understood that modifications or other methods known in the art for preparation of compounds having similar functional groups may be substituted for the above procedures.

EXAMPLES

Using techniques and procedures of the general type set forth hereinbefore, the following compounds are prepared.

Example 1.—α-Fluoro-1-naphthaleneacetic acid and metal salts.

A solution of 23.2 g. (0.1 moles) of ethyl α-fluoro-1-naphthaleneacetate in 300 ml. of anhydrous ethanol is added to a solution of 4.0 g. of sodium hydroxide in 250 ml. of anhydrous ethanol at room temperature. After stirring for 15 minutes, the mixture is cooled in ice water for 1.5 hours, and the formed precipitate is collected and dried in vacuo at 70° C. The yield of sodium-α-fluoro-1-naphthaleneacetate is practically quantitative. The substance has M.P. 215–220° C.

A solution of 9.04 g. (0.04 moles) of the above sodium salt in 130 ml. of water is treated with 50 ml. of N hydrochloric acid. The precipitate is collected and dried in vacuo on $P_2O_5$ at room temperature. Yield practically quantitative. M.P. 129.5–130.5° C.

The potassium and the lithium salts are prepared from the free acid by treatment with one equivalent amount of the alkali metal hydroxide in water. The ammonium salt is prepared by reaction with an excess of aqueous ammonia. In any case water is removed by distillation in vacuo to recover the crystalline salt as the residue. In an analogous way the trimethylammonium salt is prepared from the free acid and trimethylamine. By a double exchange reaction the zinc salt was prepared from zinc chloride and sodium α-fluoro-1-naphthaleneacetate.

Example 2.—α-Fluoro-1-naphthalenemalonic acid and metal salts

An amount of 10 g. of diethyl α-fluoro-1-naphthalenemalonate is dissolved in 150 ml. of anhydrous ethanol by gently warming to about 50° C., then the solution is cooled to about room temperature and a solution of 2.6 g. of sodium hydroxide in 30 ml. of anhydrous ethanol are added. The mixture is stirred for 30 minutes, then cooled in ice water and filtered. The collected precipitate is the disodium salt of α-fluoro-1-naphthalenemalonic acid. The yield is practically quantitative.

A solution of 5.84 g. (0.02 moles) of the above disodium salt in 100 ml. of water is treated with 25 ml. of N hydrochloric acid. The precipitate is collected and dried. Yield practically quantitative. The following salts are prepared, either by hydrolizing the diethyl ester with the appropriate metal hydroxide or by the usual procedures for preparing metal salts of carboxylic acids:

Potassium—α-fluoro-1-naphthalenemalonate
Lithium—α-fluoro-1-naphthalenemalonate
Calcium—α-fluoro-1-naphthalenemalonate
Barium—α-fluoro-1-naphthalenemalonate
Zinc—α-fluoro-1-naphthalenemalonate Example 3.—Potassium ethyl α-fluoro-1-naphthalenemalonate To a solution of 142.9 g. (0.47 moles) of diethyl α-fluoro-1-naphthalenemalonate acid in 1,300 ml. of anhydrous ethanol, 840 ml. of a 3% (w./v.) solution of KOH in anhydrous ethanol (0.45 moles) are added. A precipitate gradually forms, and is collected and dried. Yield 114 g. (77%); M.P. 160–170° C.

Example 4.—Di-tris-(2-hydroxyethyl)-ammonium α-fluoro-1-naphthalenemalonate

An amount of 24.8 g. of α-fluoro-1-naphthalenemalonic acid is added to a solution of 90 g. of tris-(2-hydroxyethyl)-amine in 1000 ml. of ethanol and the mixture is stirred for some minutes. The precipitate is collected and dried. The yield is practically quantitative.

Example 5.—Butyl α-fluoro-1-naphthaleneacetate

An amount of 20.4 g. of α-fluoro-1-naphthaleneacetic acid is refluxed for 10 hours with 300 ml. of butanol in which 5 g. of hydrogen chloride were previously dissolved. After cooling, the solvent is removed in vacuo and the residue is distilled under reduced pressure. Yield 14.9 g. (78%).

Example 6.—Ethyl α-fluoro-1-naphthaleneacetate

By a process substantially identical with the one described in the preceding example, the ethyl ester was prepared in a 83.5% yield. Boiling point 122–126° C./0.2 mm.

Example 7.—Di-propyl α-fluoro-1-naphthalenemalonate

An amount of 24.8 g. of α-fluoro-1-naphthalenemalonic is refluxed for 12 hours with 500 ml. of propanol in which 5 g. of hydrogen chloride were previously dissolved. After cooling, the solvent is removed in vacuo and the residue distilled under reduced pressure. Yield 28 g. (84%)

Example 8.—Sec-butyl α-fluoro-1-naphthaleneacetate

Prepared as described in Examples 5 and 6 for the butyl and ethyl esters. Yield 77%.

Example 9.—N-iso-propyl-α-fluoro-1-naphthaleneacetamide

A mixture of 20.4 g. of α-fluoro-1-naphthylacetic acid, 100 ml. of anhydrous chloroform and 20 ml. of thionyl chloride is heated to reflux for 1 hour, then the solvents and the excess thionyl chloride are removed in vacuo and the residue is distilled.

To a solution of 2.2 g. of the above prepared α-fluoro-1-naphthaleneacetyl chloride in 50 ml. of benzene, 1.5 g. of isopropylamine are added, and the mixture is warmed at 60° C. for 1 hour. After cooling the mixture is filtered, the filtrate is washed with aqueous sodium bicarbonate, with dilute hydrochloric acid and with water, dried on sodium sulphate and evaporated to dryness. Yield 18.5 g. (76%).

By much the same process, i.e. by treating the acyl chloride with the appropriate amine, also N-allyl-α-fluoro-1 - naphthaleneacetamide and N,N-diethyl-α-fluoro - 1-naphthaleneacetamide were prepared.

Example 10.—Di-N-iso-butyl-α-fluoro-1-naphthalenemalonamide

A mixture of 24.8 g. of α-fluoro - 1 - naphthalenemalonic acid, 150 ml. of anhydrous chloroform and 50 ml. of thionyl chloride is heated to reflux for 1 hour, then the solvent and the excess thionyl chloride are removed in vacuo and the residue is distilled.

To a solution of the thus prepared α-fluoro-1-naphthalenemalonyl dichloride (2.8 g.) in 70 ml. of benzene, 3 g. of isobutylamine are added, and the mixture is warmed at 60° C. for 1 hour. After cooling the mixture is treated as described in the preceding example, and the organic layer is evaporated to dryness. Yield 2.5 g. (61%).

By the same process, i.e. by treating the acyl chloride with ethyl-methyl-amine, N-methyl - N - ethyl-α-fluoro-1-naphthalenemalonamide was prepared.

Example 11

From the acyl chlorides, prepared according to the procedure described in Examples 9 and 10, by reaction with hydroxy compounds in pyridine the following esters were prepared:

2-nitroethyl α-fluoro - 1 - naphthaleneacetate by the reaction of α-fluoro - 1 - naphthaleneacetyl chloride and 2-nitroethanol.

Di-iso-octyl α-fluoro - 1 - naphthalenemalonate by the reaction of α-fluoro - 1 - naphthalenemaloacyl chloride and iso-octanol.

The compounds of the present invention are useful for the modification and alteration of the growth of plants and plant parts and for the control of the growth and the kill of plants and plant parts. Thus, they are advantageously employed in controlling, inhibiting or arresting the growth of undesirable plants and weed seeds, both aquatic and terrestrial. The compounds of the present invention are also useful in general for the various purposes in the art of growth control and regulation for which plant hormones are suitable. In these various uses, plants and/or plant parts are exposed to the action of the compounds. Good results are obtained when employing a growth-altering amount or a herbicidal amount. In conventional operations, growth-modifying effects are obtained in soil at dosages of one pound or more per acre, and in post-emergent applications, with compositions containing 1000 parts per million by weight.

These methods may be carried out when employing the unmodified compounds and applying the same to the aerial portions of plants, to plant parts, to soil, to water adjacent to aquatic plants or to other material or artificial plant growth media. However, the present invention also embraces the employment of a liquid or dust composition containing the compounds. In such usage, the compounds can be modified with one or a plurality of growth-altering adjuvants, or herbicide adjuvants, or parasiticide adjuvants and/or inert carriers. Such adjuvants and/or carriers include water, organic solvents, petroleum distillates, surface active dispersing agents, aqueous emulsions (water-in-oil or oil-in-water) and finely divided solids such as chalk, talc, bentonite and other clays. The compounds may be employed either as the sole active agent in such compositions or in admixture with other plant growth control agents, hormones, contact herbicides, pesticides and/or modifying agents. The particular combination or composition to be employed will be guided by the particular results to be accomplished and is readily determined by the skilled in the art.

In representative operations for herbicidal use in single active ingredient applications against terrestrial plants, it is found that substantially complete controls of the unwanted growth of terrestrial plants, morning glory and peas are obtained when potassium ethyl α-fluoro-1-naphthalenemalonate is applied in an amount equivalent to 5 pounds per acre to beds seeded with the above plant species.

In another representative operation, substantially complete controls of the unwanted growth of spring clotbur, pigweed, morning glory, peas and radish were obtained when potassium ethyl α-fluoro - 1 - naphthalenemalonate was applied as an aqueous spray to the crops in post-emergent applications.

In a further embodiment, substantially complete control of pigweed, wild mustard, bindweed and ragweed was obtained when α-fluoro - 1 - naphthaleneacetic acid was applied at a dosage rate of 5 pounds per acre to seed beds seeded with the above plant species.

Additionally, α-fluoro - 1 - naphthaleneacetic acid, when sprayed as an aqueous spray on preselected plants using a spray rate of 5000 parts active compound per million parts of treating liquid, gave substantially complete control of the undesired plants pigweed, bindweed and ragweed.

In a further embodiment, the products of the present invention, or compositions containing the same advantageously can be employed in combination with other plant growth modifying agents either as adjuvants or supplementary materials for both terrestrial and aquatic applications. Representative agents include 2-chloro-4,6-bis(ethylamino)-s-triazine;
2-chloro-4-ethylamino-6-isopropylamino-s-triazine;
2-methoxy-4,6-bis(isopropylamino)-s-triazine;
3-(p-chlorophenyl)-1,1-dimethylurea;
3-(p-chlorophenyl)-1,1-dimethylurea acetate;
3-phenyl-1,1-dimethylurea;
3-phenyl-1,1-dimethylurea trichloroacetate;
2,4-dichlorophenoxyacetic acid, its salts and esters;
2,4,5-trichlorophenoxyacetic acid, its salts and esters;
2-methyl-4-chlorophenoxyacetic acid, its salts and esters;
2-(2,4,5-trichlorophenoxy)propionic acid, its salts and esters;
propylethyl-n-butylthio-carbamate;
isopropyl N-(3-chlorophenyl)-carbamate;
cis and trans 2,3-dichloroallyl-diisopropyl thiocarbamate;
ethyl di-n-propylthiocarbamate;
4-chloro-2-butynyl N-(3-chlorophenyl)-carbamate;
2,3,6-trichlorobenzoic acid, its salts and esters;
2,3,5,6-tetrachlorobenzoic acid, its salts and esters;
2-methoxy-3,6-dichlorobenzoic acid, its salts and esters;
2,2-dichloropropionic acid, its salts and esters;
trichloroacetic acid, its salts and esters;
4,6-dinitro-s-sec.-butylphenol;
3,5-dinitro-o-cresol;
pentachlorophenol;
5-bromo-3-isopropyl-6-methyluracil;
sodium arsenite;
dimethylarsenic acid;
tricalcium arsenate;
sodium chlorate;
sodium borates;
3,6-endoxohexahydrophthalic acid;
0-(2,4-dichlorophenyl)-0-methyl isopropylphosphoramidothioate;
3,4-dichloropropionanilide;
1,2-dihydroxypyridazine-3,6-dione;
3-amino-1,2,4-triazole;
2,3,6-trichlorophenylacetic acid, its salts and esters;
1,1'-ethylene-2,2'-dipyridylium dibromide;
2,6-dinitro-N,N-di-n-propyl-2,2,2-trifluoro-p-toluidine;
α-chloro-N-diallylacetamide;
herbicidal oils; and other inorganic salts and aliphatic aromatic and heterocyclic organic compounds.

In representative operations of such embodiment, good controls of several species of broad and narrow leaf terrestrial plants are obtained when a mixture of an α-fluoro-1-naphthalenealkanoic acid compound and a plant growth modifying agent of one of the class comprising triazine compounds, substituted phenyl urea compounds, phenoxy compounds, carbamate compounds, substituted benzoic acid compounds, halogenated aliphatic acid compounds, substituted uracil compounds, arsenical compounds and inorganic salts as above named, are applied to plants at a rate sufficient to supply from about 0.5 to about 15 pounds per acre of the α-fluoro-1-naphthalenealkanoic acid compound and from about 0.12 pound to about 4000 pounds per acre of the second plant growth modifying agent. Good results are also obtained at normal field application concentrations.

We claim:
1. A compound of the formula:

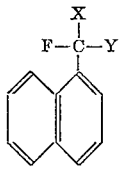

where X is selected from the group consisting of

—COOH and —COOM, M being ammonium, an alkali metal, a lower alkylamine, or a lower alkanolamine, and Y is selected from the group consisting of COOH, COOM and COOR, wherein M has the foregoing significance and R is a lower alkyl, and wherein each lower alkyl or lower alkanol contains from 1 to 10 carbon atoms.

2. Alkali metal ethyl α-fluoro-1-naphthalenemalonate.
3. The compound as defined in claim 2 wherein the alkali metal is sodium or potassium.

References Cited
UNITED STATES PATENTS 3,227,736  1/1966  Tschesche et al. ____ 260—475
3,567,742  3/1971  Cavalleri et al. __ 260—475 SC

OTHER REFERENCES

Cope et al.: J. Org. Chem., 14, pp. 856–861 (1949).

LORRAINE A. WEINBERGER, Primary Examiner
E. J. SKELLY, Assistant Examiner

U.S. Cl. X.R.

71—97, 111, 112, 115, 118; 260—429.9, 438.1, 439 R, 465 G, 469, 501.15, 501.16, 515 A, 544 M, 558 R

UNITED STATES PATENT OFFICE
CERTIFICATE OF CORRECTION

Patent No. 3,770,803      Dated November 6th, 1973

Inventor(s) Bruno Cavalleri, Elvio Bellasio, Emilio Testa, and Giulio Maffii, assignors to Lepetit, S.p.A., Milan, Italy.

It is certified that error appears in the above-identified patent and that said Letters Patent are hereby corrected as shown below:

Please enter the following in the heading of the above patent:

"Claims priority of Great Britain No. 37197/67 filed August 14th, 1967."

Signed and sealed this 24th day of September 1974.

(SEAL)
Attest:

McCOY M. GIBSON JR.
Attesting Officer

C. MARSHALL DANN
Commissioner of Patents